Feb. 8, 1938.   C. H. BOCK   2,107,850
SERVICE APPARATUS
Filed Dec. 17, 1934   5 Sheets-Sheet 1

INVENTOR
CLARENCE H. BOCK
BY J. P. Keiper
ATTORNEY

Feb. 8, 1938. C. H. BOCK 2,107,850
SERVICE APPARATUS
Filed Dec. 17, 1934 5 Sheets-Sheet 2

INVENTOR
CLARENCE H. BOCK
BY
ATTORNEY

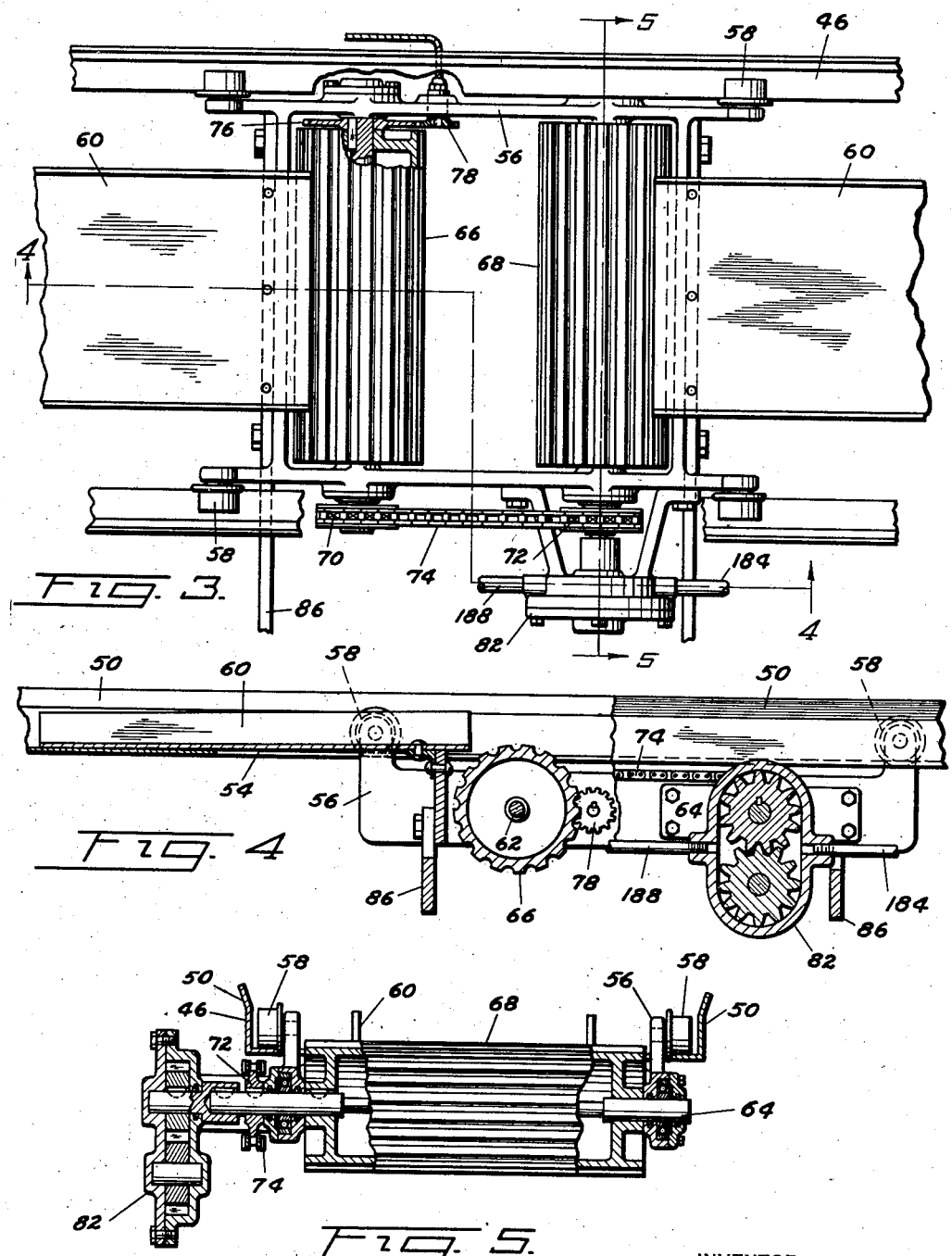

Feb. 8, 1938.  C. H. BOCK  2,107,850
SERVICE APPARATUS
Filed Dec. 17, 1934   5 Sheets-Sheet 4

INVENTOR
CLARENCE H. BOCK
BY
ATTORNEY

Feb. 8, 1938. C. H. BOCK 2,107,850
SERVICE APPARATUS
Filed Dec. 17, 1934 5 Sheets-Sheet 5

INVENTOR
CLARENCE H. BOCK
BY
ATTORNEY

Patented Feb. 8, 1938

2,107,850

UNITED STATES PATENT OFFICE 2,107,850

SERVICE APPARATUS

Clarence H. Bock, Detroit, Mich., assignor to Bendix Aviation Corporation, South Bend, Ind., a corporation of Delaware Application December 17, 1934, Serial No. 757,930

17 Claims. (Cl. 73—51)

This invention relates to service apparatus and more particularly to an apparatus for testing the brakes of a motor vehicle.

Broadly the invention comprehends an apparatus for testing the brakes of a motor vehicle including a plurality of hydraulic lifts, one supporting parallel runways having thereon hydraulically actuated brake testing units adapted to rotate the wheels of the vehicle against the resistance of their associated brakes, and the other so arranged as to raise the vehicle from the brake testing units so that wheels of the vehicle may be freely rotated to ascertain whether or not the brakes drag or to remove the wheels for replacement or repair of the brakes.

The various instrumentalities assembled in the apparatus are so arranged and connected one with another that an electrical motor-driven pump delivers fluid under pressure from a reservoir to a chamber to elevate one of the lifts. When this lift is elevated to its maximum, a valve which is set to open at a predetermined pressure above that required to elevate the lift opens and fluid is delivered through suitable conduits to fluid actuated motors arranged to drive respective brake testing units, and the fluid is returned from the motors through suitable conduits to the reservoir. A control valve is provided so that the fluid pressure motors may be stopped at the will of the operator, and upon stopping the fluid pressure motors a safety valve functions to prevent rupture of the apparatus.

Upon completing an operation on the brake testing units it may be found desirable to freely rotate the wheels to ascertain whether or not the brakes drag. Under these conditions a manually operated valve is manipulated to admit fluid to the second lift to raise the vehicle clear of the brake testing units. Upon completion of both tests the electrical motor is cut out and the manually-operated valve is again manipulated to permit the return of the fluid to the reservoir, whereupon both of the lifts move to their normal positions.

An object of the invention is to provide a hydraulic lift having thereon a plurality of hydraulically actuated brake testing units.

Another object of the invention is to provide a hydraulic lift having thereon hydraulically actuated brake testing units, the lift and brake testing units being operable in sequence.

Another object of the invention is to provide a brake testing apparatus for a motor vehicle including a plurality of hydraulically actuated lifts, one having thereon parallel runways supporting a plurality of hydraulically actuated brake testing units, and the other arranged for raising the vehicle from the brake testing units.

A further object of the invention is to provide a service apparatus for a motor vehicle including a hydraulically actuated lift supporting parallel runways having thereon hydraulically actuated brake testing units, and a second hydraulic lift for raising the vehicle from the brake testing units, and means for delivering fluid under pressure to the lifts and the brake testing units for actuation thereof.

Other objects of the invention will appear from the following description taken in connection with the drawings forming a part of this specification and in which,—

Fig. 1 is a side elevation of a service apparatus illustrating a motor vehicle in position thereon;

Fig. 3 is a top plan view of a brake testing unit;

Fig. 4 is a sectional view substantially on line 4—4, Fig. 3;

Fig. 5 is a cross-sectional view substantially on line 5—5, Fig. 3;

Figure 2:
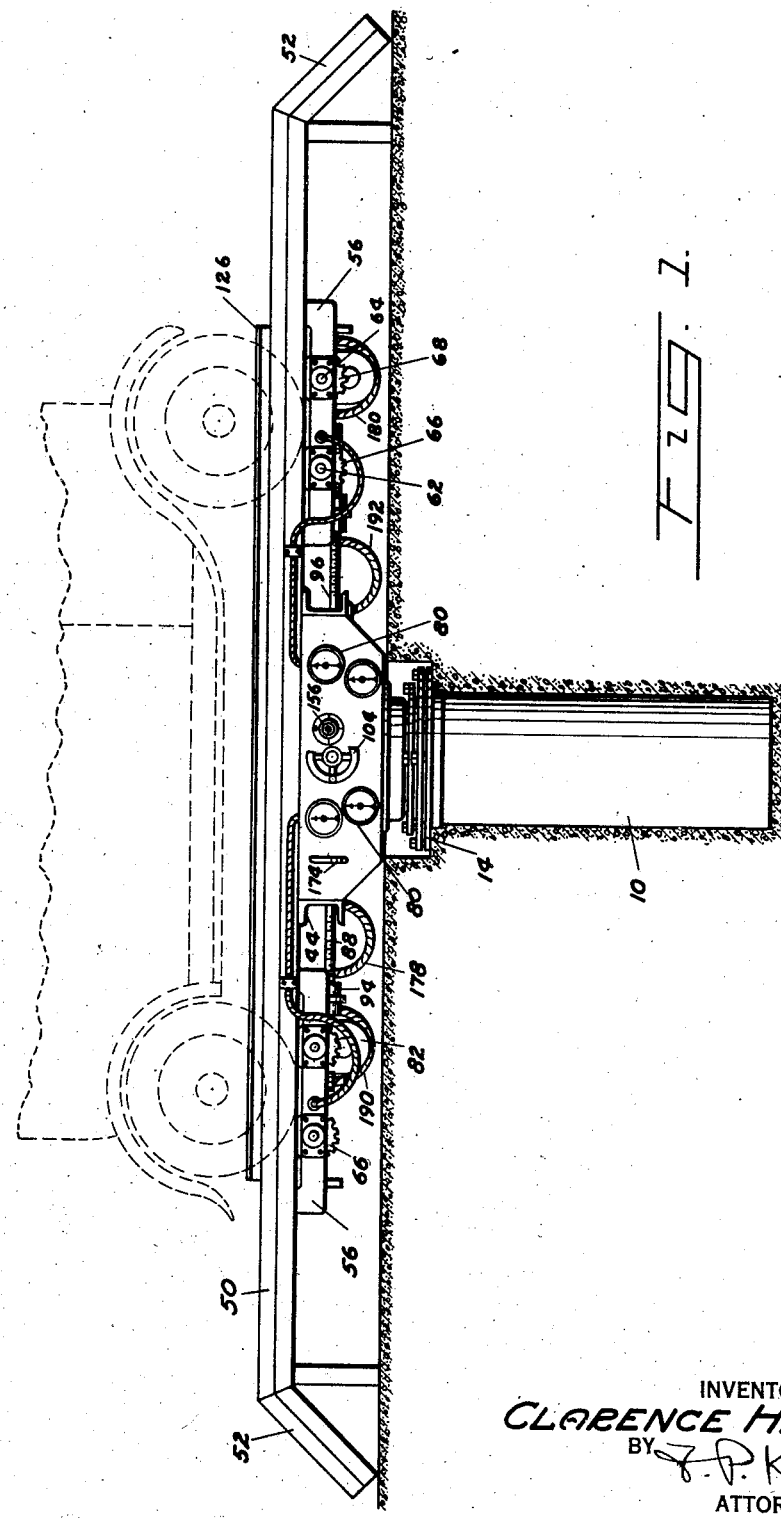
Fig. 2 is a top plan view of the apparatus.
Figure 2:
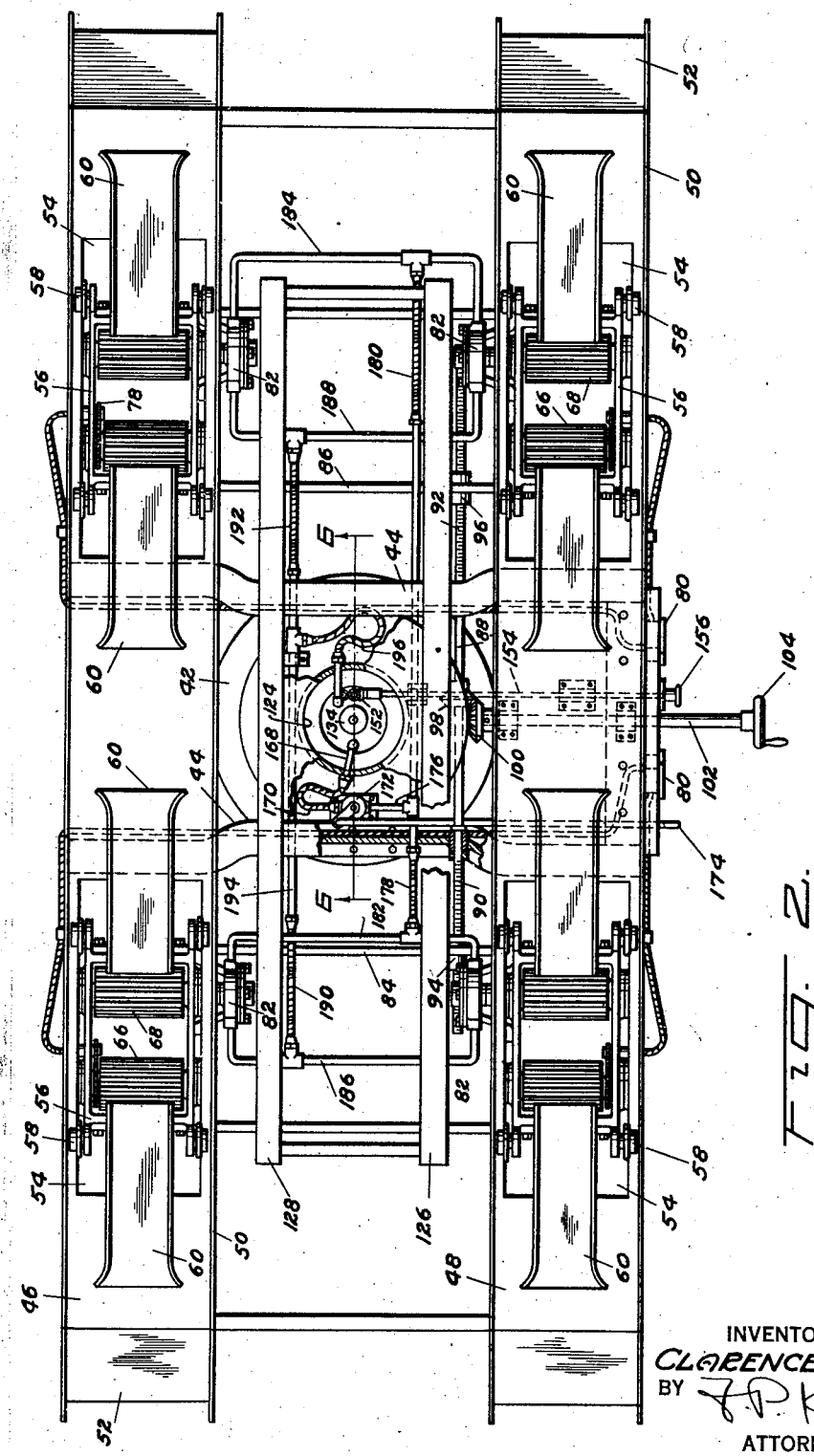
Figure 6:
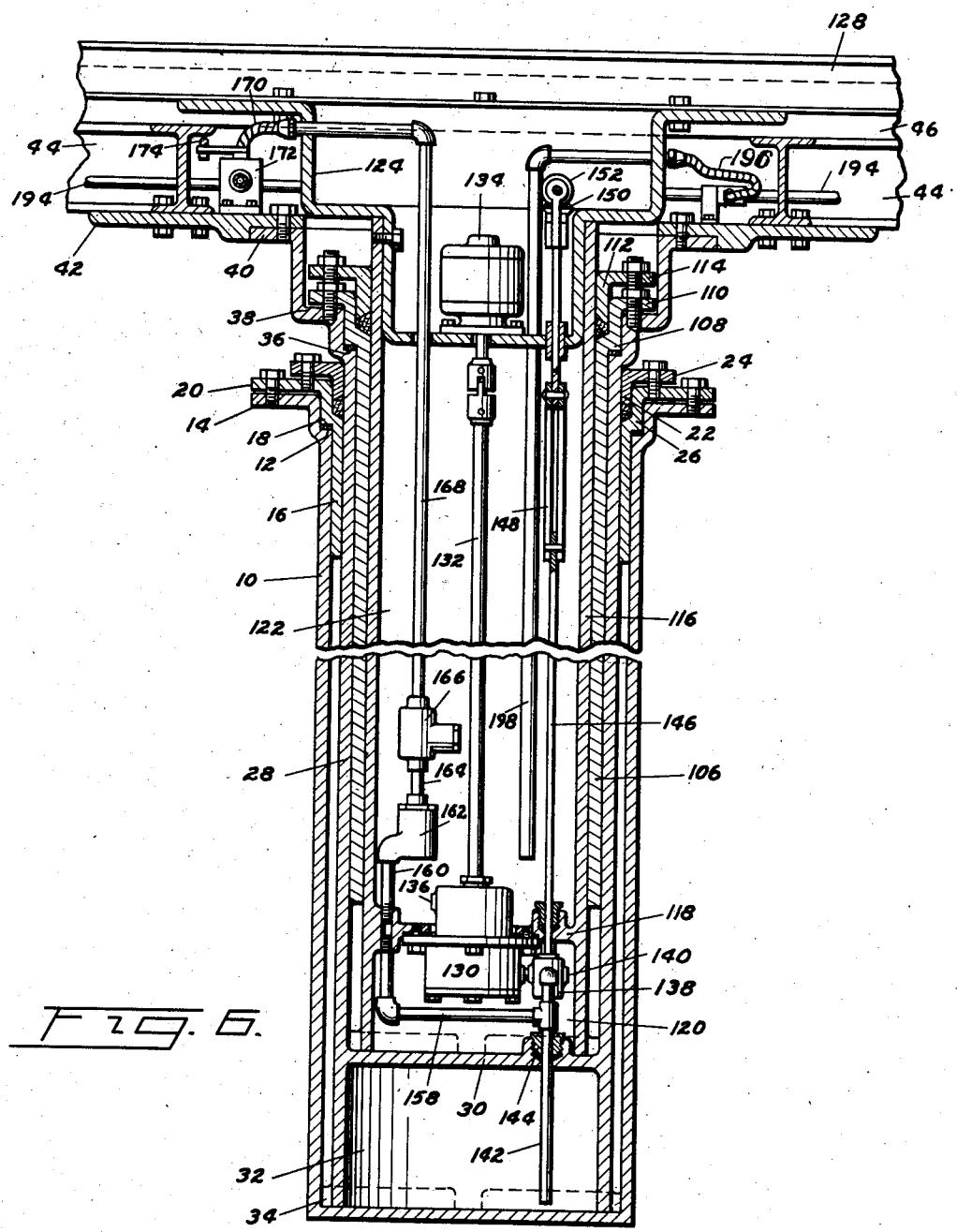
Fig. 6 is a vertical sectional view partly broken away.
Figure 7:
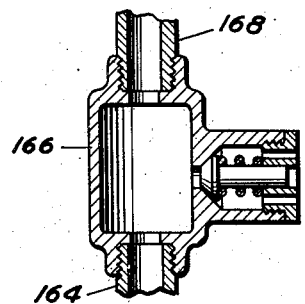
Fig. 7 is a sectional view of the relief valve.
Figure 8:
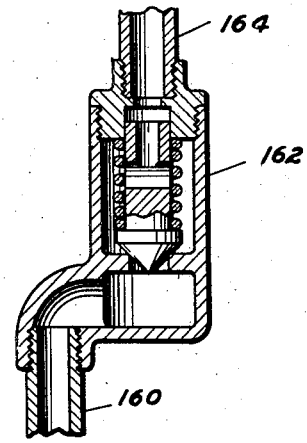
Fig. 8 is a sectional view of the fluid pressure valve.
Figure 9:
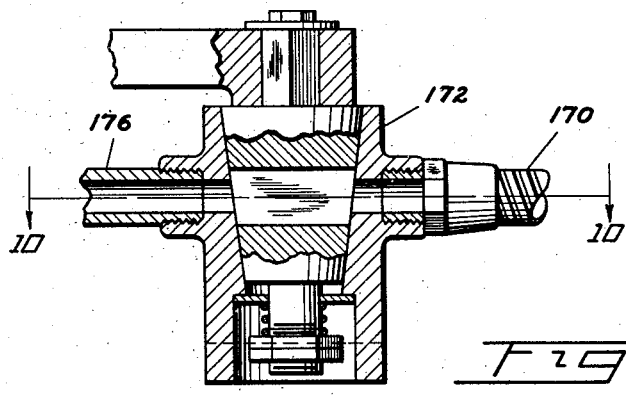
Fig. 9 is a sectional view of one of the control valves.
Figure 10:
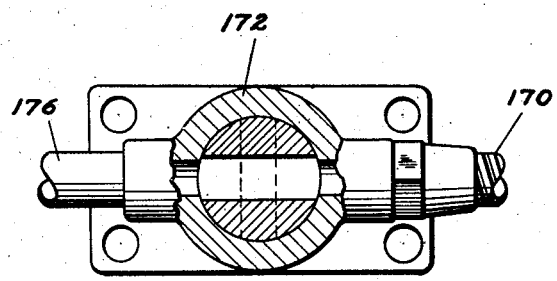
Fig. 10 is a top plan view of the valve illustrated in Fig. 9.

Referring to the drawings in which similar reference numerals indicate similar parts throughout the similar views thereof, 10 represents a cylinder closed at one end and open at its other end. A small section of the cylinder adjacent its open end has an increased diameter providing a shoulder 12, and a circumferential flange 14 is provided at the open end of the cylinder. This cylinder may be embedded in the earth up to the flange 14, preferably the flange 14 is flush with the surface of the earth or the surface of the floor of a motor vehicle service station.

A double diametral sleeve 16 fitted in the open end of the cylinder has a shoulder 18 and a circumferential flange 20. The shoulder 18 is opposed to the shoulder 12 with suitable packing therebetween, and the flange 20 overlays the flange 14 on the cylinder and is suitably secured thereto as by bolts. Another sleeve 22 is fitted in that portion of the sleeve 16 having the larger diameter, and the inner diameter of this sleeve corresponds to the inner diameter of that portion of the sleeve 16 having the smaller diameter. The outer end of the sleeve 22 has a circumferential flange 24 overlaying the flange 20 on the double diametral sleeve 16, and is suitably secured thereto as by bolts, and the inner end of the sleeve 22 is opposed to a shoulder 26 on the double diametral sleeve with suitable packing therebetween.

A piston 28 mounted for reciprocation in the sleeves 16 and 22 has a head 30 spaced from the inner end of the piston to provide a chamber 32, and formed on the extreme inner end of this piston is a guide 34 fitted snugly in the cylinder 10. The upper or outer end of the piston has a double diametral section of greater diameter than the piston providing a shoulder 36 and a shoulder 38, and formed on the extreme upper end of the piston is a flange 40.

An annular plate 42 bolted or otherwise secured to the flange 40 supports corresponding beams 44 arranged in spaced relation to one another and equi-distant from the axis of the cylinder 10 or the piston 28. The beams 44 support parallel channel members or runways 46 and 48 having corresponding sides 50 which serve as protective guides for the wheels of a vehicle when driven on the runway and as strengthening members for the runways, and suitably attached to the respective ends of each guide way is a ramp 52 so that a motor vehicle may be easily driven onto and off of the runway. The runways are slotted as indicated at 54, and these slots are arranged symmetrically about the piston for the reception of four brake testing units.

Each brake testing unit includes a frame 56 having flanged rollers 58 mounted thereon for travel on the runways with their flanges engaging the parallel side edges of the periphery defining the slots so that the travel of the rollers will be confined in a path parallel to the longitudinal axis of the runways. The frame 56 is suspended from the rollers 58 and suitably secured to the respective ends of the frames are protective guides 60 bridging the slots 54.

Spaced shafts 62 and 64 are suitably journaled on the frames 56, and corresponding corrugated rollers 66 and 68 are keyed respectively to the respective shafts. The peripheries of these rollers intercept a horizontal plane slightly above the surface of the runways, and the rollers are sufficiently spaced to provide a suitable seat for the conventional wheel of a motor vehicle. Sprockets 70 and 72 are keyed respectively to the respective shafts 62 and 64, and a sprocket chain 74 connects the sprockets. The shaft 62 has connected thereto a gear 76 in mesh with a relatively smaller gear 78 mounted on the frame and suitably connected to an indicating device 80 such as a tachometer mounted on an instrument board attached to the side of one of the runways, and the shaft 64 has keyed thereto one of the gears of a fluid pressure motor 82.

The frames of the oppositely disposed brake testing units are connected by cross bars 84 and 86 so that the units of the respective pairs may move together, and, to provide for concurrent movement of the respective pairs of brake testing units so that symmetrical loading of the piston may be had, a rod 88 suitably supported for rotation has its ends reversely threaded as indicated at 90 and 92. The threaded portion 90 on the rod is received by an internally threaded sleeve 94 on the cross bar 84, and the threaded portion 92 on the rod is received by an internally threaded sleeve 96 on the cross bar 86. A beveled gear 98 keyed on the rod 88 meshes with a beveled gear 100 keyed on one end of a shaft 102, and a hand wheel 104 is keyed on the other end of the shaft 102. By rotating the hand wheel the respective pairs of brake testing units may be moved toward or away from one another to accommodate motor vehicles having different wheel bases.

In testing the brakes associated with the wheels of a motor vehicle it is frequently desirable to elevate the vehicle so that the wheels may be freely rotated to ascertain whether or not the brakes drag, or to remove a wheel so that the brakes may be repaired. To facilitate in this, the piston 28 has fitted therein a sleeve 106 having a small section adjacent its upper end of increased diameter providing a shoulder 108 opposed to the shoulder 36 on the piston 28 with suitable packing therebetween, and a flange 110 overlaying the shoulder 38 and suitably secured thereto as by bolts. The section of the sleeve 106 having the larger diameter receives a relatively short sleeve 112, and between the inner end of this sleeve and the shoulder 108 is a suitable packing, and the sleeve 112 has a flange 114 overlaying the flange 110 and suitably secured thereto by bolts.

A piston 116 is supported for reciprocation by the sleeves 106 and 112. This piston has a head 118 spaced from the inner end thereof to provide a chamber 120 forward of the head and a reservoir 122 back of the head, and fitted in the upper or outer end of the piston is a bracket 124 supporting a carriage including parallel beams 126 and 128 suitably spaced apart and of sufficient length to receive the front and rear axles of a conventional motor vehicle.

A fluid pressure pump 130 suitably mounted on the head of the piston 116 is connected by a driving rod 132 to the armature shaft of an electrical motor 134 mounted on the bracket 124 on the upper or outer end of the piston 116. This motor may be connected to any suitable source of electrical supply.

The pump 130 has its intake port 136 in direct communication with the reservoir 122 and its discharge port is connected to a control valve 138. This valve communicates as at 140 directly with the chamber 120 and also by a pipe 142, extending through a packing gland 144 in the head of the piston 28, with chamber 32. The valve 138 is controlled by a sectionalized rod 146 having an overrunning connection 148, and a beveled gear 150 on the rod meshes with a bevel gear 152 on a shaft 154 to which is keyed a hand wheel 156.

A pipe 158 connected to the pipe 142 is threaded in a port in the head 118 of the piston 116, and a short section of pipe 160 also threaded in the port is connected to a fluid pressure valve 162 set to open at a predetermined pressure. This valve is connected in turn by a short pipe section 164 to a relief valve 166, and the relief valve is connected by a section of pipe 168 and a flexible conduit 170 to a control valve 172 actuated by a rod 174.

The valve 172 is connected by a pipe 176 and flexible conduits 178 and 180 and sections of pipe 182 and 184 to the intake ports of the fluid pressure motors 82, the discharge ports of which are connected by pipes 186 and 188 and flexible conduits 190 and 192 to a section of pipe 194 connected by a flexible conduit 196 to a pipe 198 discharging into the reservoir.

In operation, the respective pairs of the brake testing units are adjusted either toward or from one another by rotating the hand wheel 104 on the shaft 102. This shaft drives the gear 100 in mesh with the gear 98 on the rod 88 resulting in rotating the rod 88, whereupon the threaded portions 90 and 92 on the ends of the rod travel in the internally threaded sleeves 94 and 96 on the cross bars 84 and 86 connecting the brake testing units in pairs. This results in moving the respective pairs of brake testers toward or away from one another, dependent upon the direction of rotation of the hand wheel 104.

After adjusting the brake testing units to the wheel base of the vehicle, the brakes of which are to undergo a test, the vehicle is driven over the ramps 52 through the runways 46 and 48 until the respective wheels of the vehicle are seated on the rollers of the respective brake testing units. The motor 134 is then energized to actuate the pump 130. Upon actuation the pump delivers fluid under pressure from the reservoir 122 to the chamber 32. This results in actuation of the piston 28 with a consequent elevation of the runways 46 and 48.

When the piston 28 reaches its maximum elevation, or upon reaching a predetermined pressure in the chamber 32, the fluid pressure valve 162 cracks and the fluid under pressure is delivered up to the valve 172. If this valve is closed, the safety valve 166 cracks and any surplus fluid is returned to the reservoir 122. With the piston 28 in its maximum elevation, the brake testing units on the runways are at an elevation where an operator may conduct a test of the brakes and make such adjustments and repairs as may be found necessary without discomfort.

If upon movement of the piston 28 to its maximum elevation the valve 172 is opened, fluid under pressure is delivered through the valve 172, the pipe 176, flexible conduits 178 and 180, and pipes 182 and 184 to the fluid pressure motors 82, resulting in actuation of these motors. Actuation of the motors 82 results in rotating the rollers 66 and 68 of the respective brake testing units to drive the respective wheels of the vehicle against the resistance of their associated brakes. As the fluid is discharged from the motors 82, it passes through the pipes 186 and 188, the flexible conduits 190 and 192, and pipe line 194, flexible conduit 196 and pipe line 198 to the reservoir.

Upon completion of the test on the brake testing units it may become desirable to elevate the vehicle so that further tests may be conducted wherein the wheels may be freely rotated to ascertain whether or not the brakes drag. This may be accomplished by closing the valve 172 to stop the brake testing units and adjusting the valve 138 so that the pump will deliver fluid to the chamber 120. Fluid under pressure in the chamber 120 actuates the piston 116, resulting in elevating the parallel beams 126 and 128 with a consequent lifting of the vehicle clear of the brake testing units. With the vehicle in this position the test may be concluded, and upon conclusion of the test the operator cuts out the motor 134 and opens the valve 138, whereupon the pistons 28 and 116 return to their normal positions and the car may be propelled under its own power over the runways and down the ramp.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A service apparatus comprising a hydraulic lift, hydraulically actuated brake testing units on the lift, and common fluid pressure means for actuating the lift and brake testing units.

2. A service apparatus comprising a hydraulic lift, hydraulically actuated brake testing units on the lift, and common fluid pressure means for actuating the lift and brake testing units in sequence.

3. A service apparatus comprising a hydraulic lift, hydraulically actuated brake testing units on the lift, means for adjusting the brake testing units symmetrically of the lift, and fluid pressure means for actuating the lift and brake testing units.

4. A service apparatus comprising a hydraulic lift, parallel runways on the lift, hydraulically actuated brake testing units on the runways, means for simultaneously adjusting the brake testing units symmetrically of the lift, and fluid pressure means for actuating the lift and brake testing units.

5. A service apparatus comprising a hydraulic lift, parallel runways on the lift, hydraulically actuated brake testing units on the runways, means for adjusting the brake testing units symmetrically of the lift, a second lift between the runways, and fluid pressure means for actuating the lifts and the brake testing units.

6. A service apparatus comprising telescopic lifts, brake testing units on one of the lifts, supports on the other lift, and fluid pressure means for actuating the lifts and the brake testing units.

7. A service apparatus comprising telescopic lifts, brake testing units on one of the lifts, means for adjusting the brake testing units symmetrically of the lift, supports on the other lift, and fluid pressure means for actuating the lifts and the brake testing units.

8. A service apparatus comprising telescopic lifts, parallel runways on one of the lifts, four longitudinally movable brake testing units on the runways, means for adjusting the brake testing units symmetrically of the lifts, parallel supports on the other lift between the runways, and fluid pressure means for actuating the lifts and the brake testing units.

9. A service apparatus comprising telescopic lifts, parallel runways on one of the lifts, four brake testing units on the runways, means for adjusting the brake testing units symmetrically of the lifts, a fluid actuated motor for operating each brake testing unit, supports on the other lift, and fluid pressure means for actuating the lifts and the motors.

10. A service apparatus comprising a cylinder, telescopic pistons in the cylinder, brake testing units on one of the pistons, supports on the other piston, and fluid pressure means for actuating the pistons and the brake testing units.

11. A service apparatus comprising a cylinder, telescopic pistons in the cylinder, parallel runways on the outer piston, brake testing units on the runways, means for adjusting the brake testing units symmetrically of the pistons, supports on the inner piston arranged in parallel relation to the runways, and fluid pressure means for actuating the pistons and the brake testing units.

12. A service apparatus comprising a lift including telescopic pistons, a fluid reservoir in the inner piston, and means for selectively delivering fluid from the reservoir to the heads of the respective pistons.

13. A service apparatus comprising a lift including telescopic pistons, a fluid reservoir in one of the pistons, and a pump in the reservoir for delivering fluid from the reservoir to the heads of the respective pistons.

14. A service apparatus comprising a lift including telescopic pistons, a fluid reservoir in the inner piston, a pump on the head of the inner piston, hydraulically actuated brake testing units on one of the pistons, supports on the other piston, and means connected to the pump for the delivery of fluid from the reservoir to the heads of the respective pistons and to the brake testing units.

15. A service apparatus comprising a movable support, a plurality of brake testing units on the support, a fluid pressure motor for operating each brake testing unit, and fluid pressure means for actuating the support and the motors.

16. A service apparatus comprising two telescopic pistons, supports on one of the pistons, a plurality of movable brake testing units on the other piston, a fluid pressure motor for actuating each brake testing unit, and fluid pressure means for actuating the piston and the motors.

17. In a service apparatus, brake testing units for at least two wheels of an automotive vehicle, each comprising spaced shafts, rollers on the shafts, means connecting the shafts for concomitant movement, a fluid pressure motor for driving one of the shafts, a common source of fluid pressure for all units and means for indicating the speed of rotation of each motor.

CLARENCE H. BOCK.